(12) United States Patent
Niewold

(10) Patent No.: US 8,123,850 B2
(45) Date of Patent: Feb. 28, 2012

(54) ENVIRONMENTALLY-FRIENDLY NEAR INFRARED REFLECTING HYBRID PIGMENTS

(75) Inventor: Lori Niewold, Anthony, NM (US)

(73) Assignee: Mayan Pigments, Inc., El Paso, TX (US)

( * ) Notice: Subject to any disclaimer, the term of this patent is extended or adjusted under 35 U.S.C. 154(b) by 0 days.

(21) Appl. No.: 12/921,998

(22) PCT Filed: Mar. 10, 2009

(86) PCT No.: PCT/US2009/036684
§ 371 (c)(1),
(2), (4) Date: Feb. 7, 2011

(87) PCT Pub. No.: WO2009/114544
PCT Pub. Date: Sep. 17, 2009

(65) Prior Publication Data
US 2011/0123792 A1   May 26, 2011

Related U.S. Application Data

(60) Provisional application No. 61/035,185, filed on Mar. 10, 2008.

(51) Int. Cl.
*C09C 1/28* (2006.01)
*C09C 1/00* (2006.01)
*C09C 3/08* (2006.01)
*C09B 67/00* (2006.01)
*C09B 67/02* (2006.01)
*C09B 7/00* (2006.01)

(52) U.S. Cl. .................... 106/487; 8/632; 8/636; 8/650; 8/652; 8/653; 8/657; 106/472; 106/473; 106/475; 106/486; 252/587; 252/7; 427/372.2; 524/82; 524/84; 524/445

(58) Field of Classification Search .................. 106/486, 106/472, 473, 475, 487; 8/632, 636, 650, 8/652, 653, 657; 252/582, 587; 427/372.2; 524/82, 84, 445
See application file for complete search history.

(56) References Cited

U.S. PATENT DOCUMENTS

| 4,842,903 | A | 6/1989 | Hayner | |
|---|---|---|---|---|
| 7,052,541 | B2 * | 5/2006 | Chianelli et al. | 106/401 |
| 2005/0007680 | A1 | 1/2005 | Naganuma et al. | |
| 2005/0207002 | A1 | 9/2005 | Liu et al. | |
| 2007/0012349 | A1 | 1/2007 | Gaudiana et al. | |
| 2008/0031508 | A1 | 2/2008 | Baloukas et al. | |
| 2010/0298482 | A1 * | 11/2010 | Niewold et al. | 524/445 |
| 2011/0113986 | A1 * | 5/2011 | Niewold et al. | 106/410 |

OTHER PUBLICATIONS

International Preliminary Report on Patentability issued in International Patent Application No. PCT/US2009/036684, mailed Sep. 23, 2010.

* cited by examiner

*Primary Examiner* — Anthony J Green
(74) *Attorney, Agent, or Firm* — McDermott Will & Emery LLP

(57) ABSTRACT

A hybrid pigment composition is provided including a pigment or a dye and a fibrous clay. The pigment composition has higher reflectance in a near infrared region than a visible light region of the electromagnetic spectrum. The fibrous clay can be selected from palygorskite, sepiolite, and mixtures thereof. The hybrid pigment composition is tunable to provide high reflectance at a desired wavelength in the near infrared region.

19 Claims, 4 Drawing Sheets

ENVIRONMENTALLY-FRIENDLY NEAR INFRARED REFLECTING HYBRID PIGMENTS

RELATED APPLICATIONS

This application claims the benefit of priority of U.S. Provisional Application Ser. No. 61/035,185, filed Mar. 10, 2008. This application discloses subject matter similar to that disclosed in U.S. Pat. Nos. 7,052,541; 7,425,235; and 7,429,294; U.S. Provisional Application No. 61/021,783 filed Jan. 17, 2008; U.S. Provisional Application No. 60/990,854, filed Nov. 28, 2007; PCT/US2009/031572, filed Jan. 21, 2009; and PCT/US2008/084786, filed Nov. 26, 2008, the contents of each herein incorporated by reference in their entirety.

FIELD OF THE INVENTION

This invention relates to hybrid pigment compositions comprising dyes or pigments and clays and articles using the hybrid pigment compositions.

BACKGROUND

Colored minerals, earths and ochers, have been used throughout human history. Natural earth minerals lend themselves to a wide range of decorations, from body paint to painting on natural or constructed walls. The colors are extremely stable, as can be seen in ancient paintings that have lasted to this day. The use of colored earth pigments is found even in the oldest civilizations.

In the scientific literature, the term Maya blue refers to a "turquoise" brilliant shade of blue that is found on murals and archaeological artifacts, for example, throughout Mesoamerica. It is described in the literature as being composed of palygorskite clay and indigo, that when mixed and heated, produce the stable brilliant blue color similar to that found in Mesoamerica. Proposed methods of preparation were performed with the intent of trying to replicate the blue color found at the historical sites and to reproduce the techniques employed by the original Maya.

H. Van Olphen, Rutherford Gettens, Edwin Littman, Anna Shepard, and Luis Torres were involved in the examination of organic/inorganic complex paint from the 1960's to the 1980's. In early studies, Littman and Van Olphen published information specifically on the synthesis of the Mayan organic/inorganic complex (Littman, *Amer. Antiquity*, 45:87-101, 1980; Littman, *Amer. Antiquity*, 47:404-408, 1982; Olphen, *Amer. Antiquity*, 645-646, 1966; Olphen, *Science*, 154:645-646, 1966). Their work did not describe the technique for making the colorant, nor explain the stability of the organic/inorganic complex. However, the results of their two decades of studies with respect to the ancient paint laid a foundation of knowledge for future investigators.

Littman synthesized indigo-attapulgite complexes and verified that his synthetic version was indistinguishable from the original pigments found in the pre-Hispanic murals and artifacts (Littman, *Amer. Antiquity*, 45:87-101, 1980; Littman, *Amer. Antiquity*, 47:404-408, 1982). The prepared samples had the same physical and chemical characteristics as the authentic Maya blue examined. Littman concluded that the remarkable stability of the attapulgite was due to the heat treatment the attapulgite received during the synthesis. Others have also synthesized compounds similar to that of Maya blue by a number of routes (Torres, *Maya Blue: How the Mayas Could Have Made the Pigment*, Mat. Res. Soc. Symp., 1988). They employed the Gettens test to determine whether the laboratory synthesis of Maya blue was indeed authentic with the same chemical resistant properties (Gettens, *Amer. Antiquity*, 27:557-564, 1962). The test was necessary because initial attempts of simply mixing the palygorskite day produced the color of Maya blue but the mixture did not possess the same chemical properties as the original organic/inorganic complex samples.

Previous literature discussions of pH pertain to the alkaline pH required to reduce the indigo prior to contacting it with the clay (Littman, *Amer. Antiquity*, 45:87-101, 1980; Littman, Amer. Antiquity, 47:404-408, 1982). Moreover, there was a lack of understanding regarding the chemistry for producing stable and nontoxic paint systems by combining dyes and pigments with fibrous clays. U.S. Pat. No. 3,950,180 describes color compositions that involve cationic organic basic colored compounds complexed to alkali-treated inorganic substances.

More recently, several patents and patent applications discussed indigo and related organic dyes complexed in an ionic interaction with inorganic supports. PCT Publication No. WO 01/04216 also describes ionic interactions in color compositions, wherein organic dyes undergo ion exchange with charged inorganic clays.

U.S. Pat. No. 3,950,180 covers a method of manufacturing color compositions that include zeolite and montmorillonite. U.S. Pat. No. 5,061,290 covers a method of using indigo derivatives as a dyeing agent. U.S. Pat. No. 4,246,036 covers the method of manufacturing color compositions that are comprised of asbestos-cement. U.S. Pat. No. 4,640,862 covers color compositions that are used for coating an expanded polystyrene "drop-out" ceiling tile. U.S. Pat. No. 4,868,018 covers color compositions that are used with a mixture of epoxy resin, epoxy resin hardener, and portland cement to form a coating which can be applied to a surface to form simulated marble products. U.S. Pat. No. 4,874,433 covers a method for encapsulating color compositions in and/or to a zeolite. U.S. Pat. No. 5,574,081 covers a method of manufacturing waterborne clay-containing emulsion paints with improved application performance using color compositions. U.S. Pat. No. 5,972,049 covers the method of manufacturing and using color compositions to form dye carriers used in the dyeing process for hydrophobic textiles. U.S. Pat. No. 5,993,920 covers the method of manufacturing and using color compositions with stone powder and/or cement powder, fine sawdust and/or the heart of a kaoliang stalk and other materials to form an incombustible artificial marble. U.S. Pat. No. 6,339,084 covers the method of manufacturing thiazine-indigo pigments. U.S. Pat. No. 6,402,826 covers the method and manufacturing of color compositions for paper coating.

U.S. Pat. Nos. 7,052,541 and 7,429,294 describe color compositions comprising neutral indigo derivative pigments and dyes complexed to the surface of inorganic clays. These materials are useful as paints and coatings for artistic and industrial purposes, including use in cements, plastics, papers and polymers. Upon grinding and heating the organic and inorganic component as solid mixtures or in aqueous solutions, the resulting color compositions have unprecedented stability relative to the original starting materials. U.S. Pat. No. 7,425,235 describes the use of similar starting materials in methods that rely on UV-light for preparing color compositions.

"Cool" pigmented colors appear as dark in the visible spectrum but exhibit high reflectance in the near-infrared (NIR) region of the electromagnetic spectrum. Cool pigments offer a number of benefits in a broad range of applications.

1. Incorporating cool pigments in roofing material products may enhance the life of the roof because the cool pigments reflect the NIR rays of sunlight, thus lowering the surface temperature of the roof. Cool pigments may also provide enhanced light-fastness properties by reflecting the NIR and thus reflecting more of the rays which would otherwise cause photo-degradation.
2. Using cool pigments in roofing materials may provide potential energy savings because the cool pigments reflect NIR, thus keeping the surface of the roof cooler and reducing the amount of energy needed to cool the structure under the roof.
3. Cool pigments can be used in military applications. For example, chlorophyll found in plants has high NIR reflectance. Articles coated with pigments with a spectral reflectance similar to chlorophyll would blend in with background flora. Thus, cool pigments used as vehicle coatings or textile colorants may provide cloaking. NIR night vision equipment is used to detect the reflectance of un-natural colors. Thus, if an article reflects color similar to that of chlorophyll, the person or hardware is essentially camouflaged.

Conventional cool pigments include inorganic, heavy-metal containing components such as cobalt and chromium oxides, or mixed-metal oxides. In addition to being strategic for military purposes, metals such as cobalt and chromium pose environmental threats. Furthermore, the manufacturing processes employed to produce such metal-oxide cool pigments can produce hazardous wastes that must be safely disposed of.

Other types of conventional cool pigments include organic-based pigments such as chlorophyll, which naturally exhibit high reflectance in the NIR. However, the weatherability or light-fastness of such materials make them less than satisfactory for use in applications, such as roofing material, which is subject to degradation from sunlight exposure.

Thus, there is a need for cool pigments that exhibit excellent physical and chemical properties, are non-heavy metal based, are environmentally friendly, "green" manufactured, and can be tunable. Tunable means that the pigment can be adjusted to provide high reflectance in the NIR at a desired wavelength.

Light is composed of a select group of colors; each characterized by a specific range of wavelengths. The combination of these wavelengths in visual light differs depending on the light source. Because of this, colors often look different when compared under the influence of different light sources, such as daylight, fluorescent light, incandescent lamps, etc.

When two objects appear to match under one light source but not under another, the match is said to exhibit metamerism. Metamerism is usually discussed in terms of two illuminants (illuminant metamerism) whereby two samples may match under one light source but not under another. Metamerism is an issue for any product category where human color perceptions under different lighting conditions are important in marketing the product. For example:

Auto manufacturers often combine various parts made from different materials or materials of the same color from different suppliers. However, they need all parts of the same color to "match" whether it is sunny or cloudy outside.

Consumers buying "matching" pants and jackets under fluorescent department store lighting expect the outfit to match in sunlight as well. Even though items may come from the same manufacturer, dyes which exhibit high levels of metamerism may appear different based on differences in the light source from indoors to outdoors.

Cosmetics, particularly makeup, is another area where dyes with high metamerism may produce one look when applied using a makeup mirror lighted with incandescent light, a different look outdoors in bright sunlight and yet a different appearance in a restaurant at night.

Thus, there is also a need for pigments that exhibit minimal metamerism.

SUMMARY

It has been discovered that hybrid pigments formed by reacting a fibrous clay, such as palygorskite or sepiolite, with a dye or pigment, a pigment can be formed that appears dark in the visible spectrum but exhibits high reflectance in the near infrared. In addition, it has been discovered that certain such hybrid pigments exhibit minimal metamerism. Thus, these hybrid pigments provide superior physical and chemical properties relative to the pure dye or pigment alone.

In certain embodiments of the present disclosure, a hybrid pigment composition is provided comprising a pigment or a dye and a fibrous clay. The pigment composition has higher reflectance in a near infrared region than a visible light region of the electromagnetic spectrum. In certain embodiments, the fibrous clay is selected from palygorskite, sepiolite, and mixtures thereof. In certain embodiments, the hybrid pigment composition is tunable to provide high reflectance at a desired wavelength in the near infrared region. The hybrid pigment composition can further comprise an additional dye and/or pigment. The additional dye or pigment comprises at least one of the following: carbon black, indigo, an indigoid, and a thioindigoid.

In certain embodiments of the present disclosure, an article is provided comprising the hybrid pigment composition comprising a pigment or a dye and a fibrous clay, wherein the pigment composition has higher reflectance in a near infrared region than a visible light region of the electromagnetic spectrum. In certain embodiments, the article has a metameric index of less than about 1. The article can be selected from molded polymer components, roofing material, clothing, textiles, and motor vehicle components.

In certain embodiments of the disclosure, a polymer composition is provided comprising a hybrid pigment comprising a pigment or a dye and a fibrous clay as a colorant. The hybrid pigment composition has higher reflectance in a near infrared region than a visible light region of the electromagnetic spectrum.

In certain embodiments of the present disclosure, a coating composition is provided comprising a hybrid pigment composition comprising a pigment or a dye and a fibrous clay as a colorant. The hybrid pigment composition has higher reflectance in a near infrared region than a visible light region of the electromagnetic spectrum. In certain embodiments, the coating composition is a paint.

In certain embodiments of the present disclosure, an article is provided, wherein the article is coated with a coating composition comprising a hybrid pigment composition comprising a pigment or a dye and a fibrous clay as a colorant. The hybrid pigment composition has higher reflectance in a near infrared region than a visible light region of the electromagnetic spectrum. In certain embodiments, the article is a motor vehicle, aircraft, boat, or military hardware.

In certain embodiments of the present disclosure, a method of cloaking an article is provided. The method comprises providing an article to be cloaked, and coating the article with a hybrid pigment composition comprising a pigment or a dye and a fibrous clay, wherein the pigment composition has higher reflectance in the near infrared region than in the visible light region of the electromagnetic spectrum. In certain embodiments, the coating composition is painted on the article.

DETAILED DESCRIPTION

Figure 1:
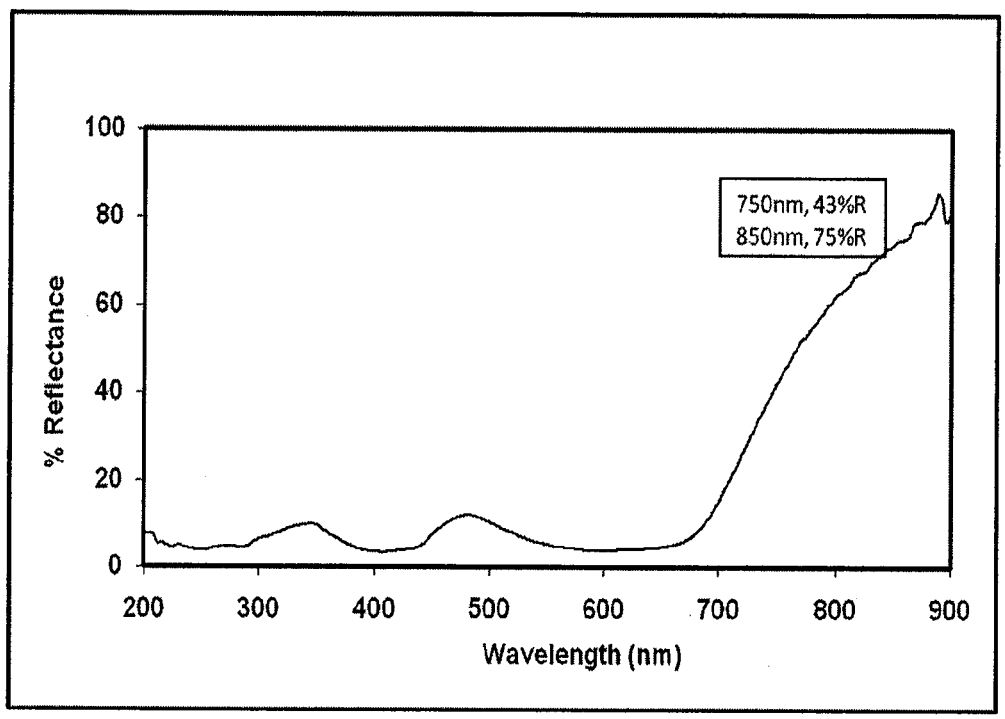
FIG. 1 is an ultraviolet/visible/near infrared (UV/VIS/NIR) reflectance spectrum of Mayacrom® Yellow Y1001 with 20% Solvent Blue 35.

In certain embodiments of the present disclosure, a hybrid pigment composition is provided comprising a pigment or a dye and a fibrous clay. The hybrid pigment composition has higher reflectance in a near infrared region than a visible light region of the electromagnetic spectrum. In certain embodiments, the fibrous clay is selected from palygorskite, sepiolite, and mixtures thereof. In certain embodiments, the hybrid pigment composition is tunable to provide high reflectance at a desired wavelength in the near infrared region. The hybrid pigment composition can further comprise at least one additional dye and/or pigment, such as carbon black, indigo, an indigoid, and a thioindigoid. Indigoids and thioindigoids can include Vat Red 41, Vat Orange 5, Vat Blue 5, and Vat Red 1.

In certain embodiments of the present disclosure, the hybrid pigment composition has higher reflection in a wavelength range of 700 nm to about 1400 nm than in a wavelength range of about 400 nm to 700 nm. In certain embodiments of the present invention, the hybrid pigment composition has higher reflection in a wavelength range of about 750 nm to about 850 nm than in a wavelength range of about 400 nm to 700 nm.

In certain embodiments of the present disclosure, an article is provided comprising the hybrid pigment composition comprising a pigment or a dye and a fibrous clay, wherein the hybrid pigment composition has higher reflectance in a near infrared region than a visible light region of the electromagnetic spectrum. In certain embodiments, the article has a metameric index of less than about 1. In certain embodiments, the article has a higher reflection in a wavelength range of 600 nm to about 850 nm than in a wavelength range of about 400 nm to 600 nm. In certain embodiments, the article has a higher reflectance in a wavelength range of 620 nm to about 750 nm than in a wavelength range of about 400 nm to 600 nm. The article can be selected from molded polymer components, roofing material, clothing, textiles, and motor vehicle components.

In certain embodiments of the disclosure, a polymer composition is provided comprising a hybrid pigment comprising a pigment or a dye and a fibrous clay as a colorant. The hybrid pigment composition has higher reflectance in a near infrared region than a visible light region of the electromagnetic spectrum. Polymer compositions according to the present disclosure can include the hybrid pigment blended with thermoplastic or thermoset polymer compositions. Polymer compositions according to the present disclosure can be used to form molded polymer components.

In certain embodiments of the present disclosure, a coating composition is provided comprising a hybrid pigment composition comprising a pigment or a dye and a fibrous clay as a colorant. The hybrid pigment composition has higher reflectance in a near infrared region than a visible light region of the electromagnetic spectrum. In certain embodiments, the coating composition is a paint or a powder.

In certain embodiments of the present disclosure, an article is provided, wherein the article is coated with a coating composition comprising a hybrid pigment composition comprising a pigment or a dye and a fibrous clay as a colorant. The hybrid pigment composition has higher reflectance in a near infrared region than a visible light region of the electromagnetic spectrum. In certain embodiments, the article is a motor vehicle, aircraft, boat, or military hardware. Military hardware can include tanks, armored personnel carriers, and weapons systems, such as artillery, rocket launchers, and anti-aircraft batteries.

In certain embodiments of the present disclosure, a method of cloaking an article is provided. The method comprises providing an article to be cloaked, and coating the article with a hybrid pigment composition comprising a pigment or a dye and a fibrous clay, wherein the hybrid pigment composition has higher reflectance in a near infrared region than in a visible light region of the electromagnetic spectrum. In certain embodiments, the coating composition can be applied to an article by any conventional application means, including painting and electrostatic powder coating.

In certain embodiments of the present disclosure, cool, tunable, hybrid pigments are formed by reacting a naturally occurring clay with an organic dye or pigment. The resultant hybrid pigment exhibits excellent thermal and chemical stability in a wide range of media such as coatings, paints, and plastics. By judiciously selecting the organic component, followed by reaction with a clay, such as palygorskite or sepiolite, the reflectance in the NIR can be tuned to a desirable wavelength.

In certain embodiments of the disclosure, the hybrid pigment is tuned to reflect NIR at a desired wavelength by reacting a plurality of dyes and/or pigments with the fibrous clays.

In certain embodiments of the invention, the hybrid pigment is tuned to reflect NIR at a desired wavelength by varying the concentration of a plurality of dyes and/or pigments to be reacted with the fibrous clay.

EXAMPLES

Figure 2:
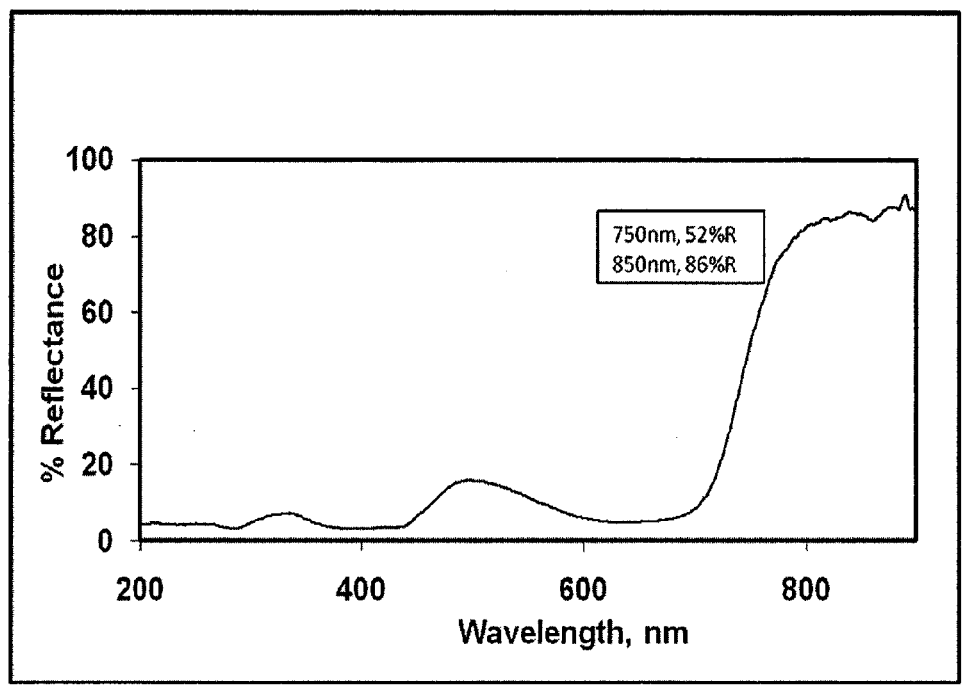
FIG. 2 is a UV/VIS/NIR reflectance spectrum of Mayacrom® Yellow Y1001 with 20% indigo.

A UV/VIS spectrophotometer equipped with an integrating sphere was used to analyze hybrid pigments. A first hybrid pigment was prepared by grinding Mayacrom® Yellow Y1001 (8 wt. % Solvent Yellow 33 reacted with 92 wt. % by weight palygorskite clay based on the total weight of Solvent Yellow 33 and palygorskite) with 20 wt. % Solvent Blue 35 based on the total weight of the Solvent Yellow 33, palygorskite, and Solvent Blue 35. A second hybrid pigment was prepared by grinding Mayacrom® Yellow Y1001 (8 wt. % Solvent Yellow 33 reacted with 92 wt. % palygorskite clay based on the total weight of Solvent Yellow 33 and palygorskite) with 20 wt. % of a purified form of indigo based on the total weight of the Solvent Yellow 33, palygorskite, and indigo. Both hybrid pigment compositions were heated for 3 hours at 150° C. The UV/VIS/NIR spectra of the two hybrids are shown in FIG. 1 and FIG. 2. FIG. 1 illustrates the spectrum of the Mayacrom® Yellow Y1001 (8 wt. % Solvent Yellow 33 reacted with 92 wt. % palygorskite clay) with 20 wt. % of Solvent Blue 35. FIG. 2. illustrates the spectrum of Mayacrom® Yellow Y1001 (8 wt. % Solvent Yellow 33 reacted with 92 wt. % palygorskite clay) with 20 wt. % of indigo.

As shown in FIG. 1, the reflectance at 750 nm is about 43% and at 850 nm, it is about 75%. In FIG. 2, reflectance at 750 nm is higher, at about 52%, and at 850 nm, it is 86%.

Certain Mayacrom® pigments, formed from dyes or pigments reacted with a fibrous clay, such as palygorskite and sepiolite, exhibit minimal metamerism, giving them a significant advantage over commercially available pigments. The Metameric Index (MI) was determined for the prepared samples. This Metameric Index results in a number which will indicate how well two materials which match under one illuminant will match under another.

To determine the Metameric Index, color was measured for three Mayacrom® pigments spanning blue, violet and red ranges, using the L*a*b* scale where L=lightness/darkness, a=redness/greenness and b=yellowness/blueness. Results were measured using a spectrophotometer equipped with an integrating sphere. The Metameric Index was computed according to the following equation:

$$MI=[(\Delta L_{n1}-\Delta L_{n2})^2+(\Delta a_{n1}-\Delta a_{n2})^2+(\Delta b_{n1}-\Delta b_{n2})^2]^{1/2}$$

where:
n1 is the first illuminant,
n2 is the second illuminant, and
$\Delta$=Value$_{sample}$−Value$_{standard}$($\Delta$=0).

An industry standard CIE illuminant D65 was chosen as the reference illuminant with a 10 degree standard observer function. The L*a*b* values were recorded using a different illuminant each time as shown in Table 1 below, where A=Incandescent Light, C=Sunlight, D65=Daylight and F10=Fluorescent Light. Based on the equation, any pigment which produces an MI of 1 or greater would exhibit metamerism.

In Table 1, Mayacrom Blue is a hybrid pigment comprising a reaction product of indigo and palygorskite. Mayacrom Violet is a hybrid pigment comprising a reaction product of Vat Red 41 and palygorskite. Mayacrom Red is Mayacrom® Red R1000, a reaction product of Vat Orange 5 and palygorskite.

TABLE 1

| Sample | Illuminant | L* | a* | b* | Illuminant | MI |
|---|---|---|---|---|---|---|
| Mayacrom Blue | A | 55.36 | −16.95 | −22.41 | D65 and C | 0.11 |
| | C | 55.33 | −16.89 | −22.5 | A and D65 | 0.21 |
| | D65 | 55.29 | −16.79 | −22.52 | D65 and F10 | 0.14 |
| | F10 | 55.4 | −16.87 | −22.51 | A and F10 | 0.13 |
| Mayacrom Violet | A | 32.41 | 12.35 | −42.69 | D65 and C | 0.06 |
| | C | 32.42 | 12.19 | −42.63 | A and D65 | 0.12 |
| | D65 | 32.39 | 12.24 | −42.65 | D65 and F10 | 0.03 |
| | F10 | 32.39 | 12.23 | −42.68 | A and F10 | 0.12 |
| Mayacrom Red | A | 39.51 | 34.21 | 13.59 | D65 and C | 0.09 |
| | C | 39.5 | 34.41 | 13.61 | A and D65 | 0.21 |
| | D65 | 39.53 | 34.39 | 13.69 | D65 and F10 | 0.06 |
| | F10 | 39.55 | 34.35 | 13.73 | A and F10 | 0.20 |

The data in Table 1 demonstrates that all three Mayacrom® hybrid pigments deliver MI indexes below 1, indicating that hybrid pigments formed from dyes or pigments reacted with a fibrous clay provide a significant anti-metamerism property.

Colors which match in one set of light or medium, but not in others, are said to be metameric. The UV/VIS reflectance spectra of pigments in a paint or plastic medium can be used to determine if a pigment will look similar in different conditions, such as lighting or the medium in which the pigment is used. It has been determined that a sharp increase in the red end of the spectrum (620-750 nm), which is described as a "tail", indicates that a color may not exhibit metameric properties, and will look the same regardless of what medium it is used in or under what light it is viewed. Pure carbon black does not exhibit a "tail" at any wavelength before 700. The addition of 1% indigo reacted with a fibrous clay, such as palygorskite produces a "tail" near 700 nm.

Figure 3:
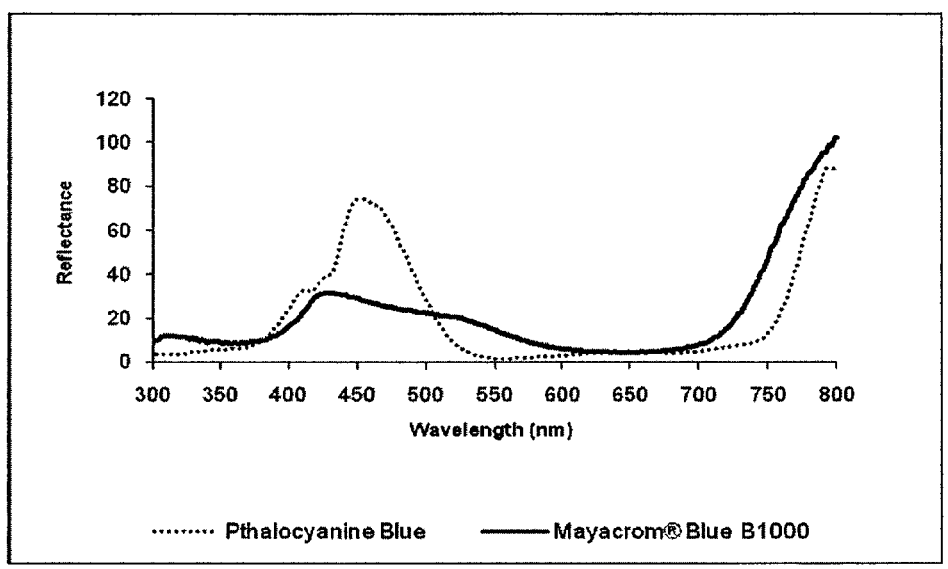
FIG. 3 are UV/VIS/NIR reflectance spectra of Mayacrom® Blue B1000 and phthalocyanine blue.

In an example illustrated in FIG. 3, phthalocyanine blue exhibits lower reflectance from 700-800 nm compared to MayaCrom® Blue B1000.

Figure 4:
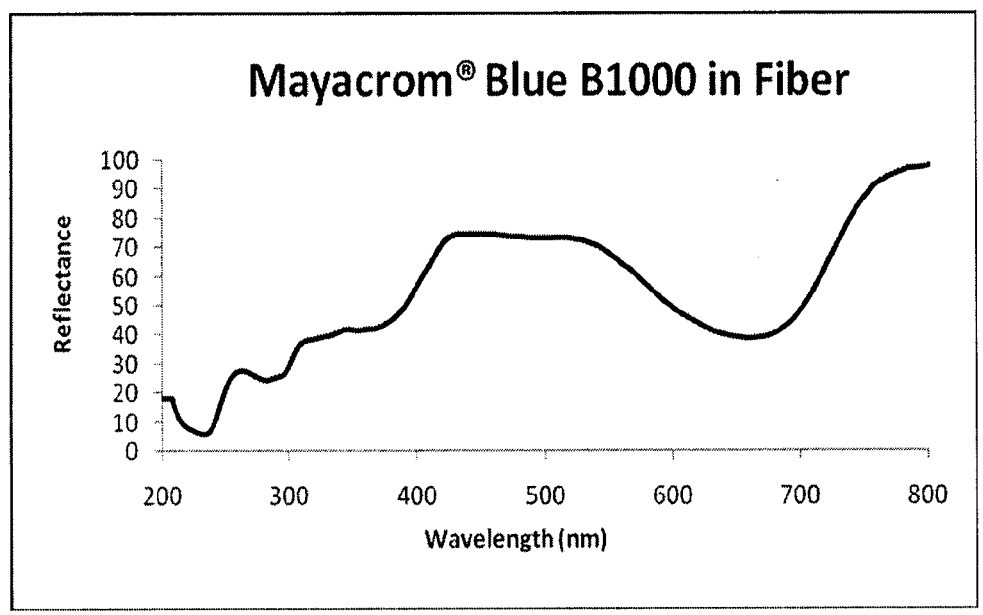
FIG. 4 is a UV/VIS/NIR reflectance spectrum of Mayacrom® Blue B1000 in nylon fiber.
Figure 5:
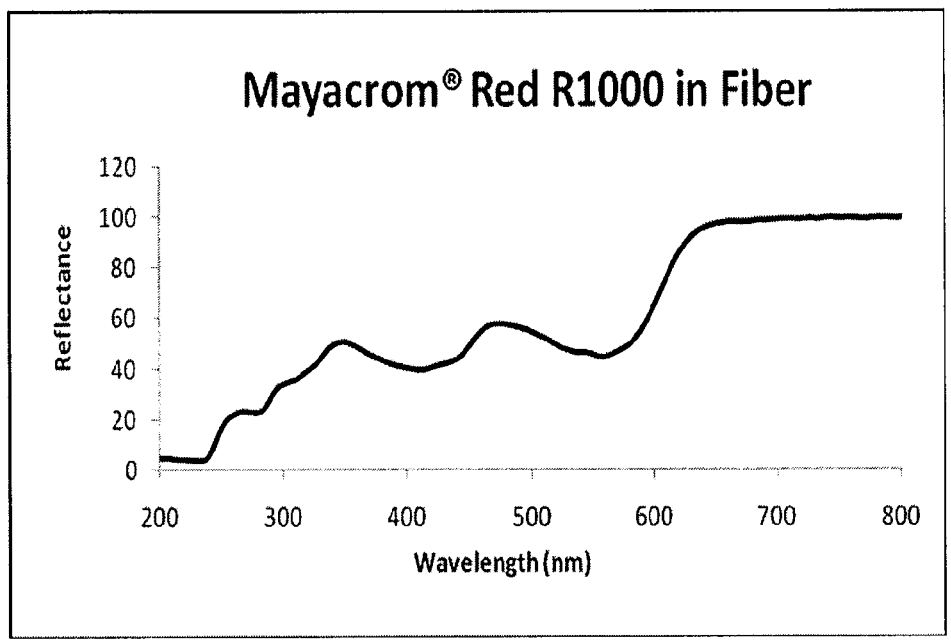
FIG. 5 is a UV/VIS/NIR reflectance spectrum of Mayacrom® Red R1000 in nylon fiber.

FIG. 4 illustrates the high reflectance of nylon fiber containing MayaCrom® Blue B1000, a hybrid pigment comprising indigo and palygorskite, while FIG. 5 illustrates the high reflectance of nylon fiber containing MayaCrom® Red R1000.

Figure 6:
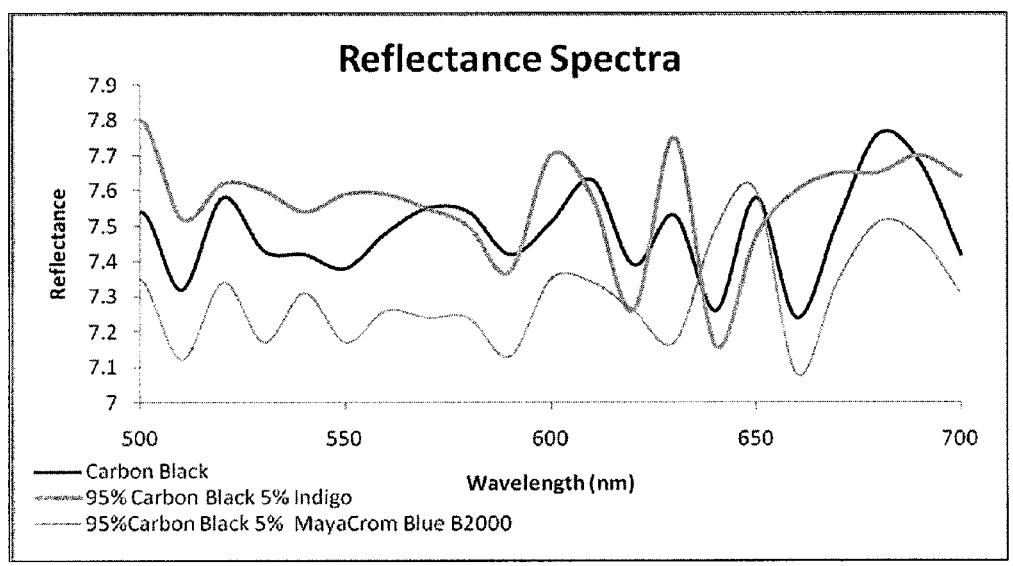
FIG. 6 are UV/VIS reflectance spectra of carbon black, carbon black and indigo, and carbon black and Mayacrom® Blue B2000.

As shown in FIG. 6, carbon black has a very low reflectance spectra in all of the visible range. However, greater reflectance is observed around 600-700 nm when a vat dye, such as indigo or a hybrid pigment, such as MayaCrom® Blue B2000, a hybrid pigment comprising indigo and palygorskite, is added to the carbon black. The samples in FIG. 6 were prepared as follows: in the first sample, 0.1 g powdered indigo and 1.9 g of carbon black were added together. A mortar and pestle was used to mix/blend the contents. A UV/VIS spectrophotometer was used to measure reflectance of the mixture from 500 to 700 nm. In the second sample, 0.1 g MayaCrom® Blue B2000 and 1.9 g of carbon black were added together. A mortar and pestle was used to mix/blend the contents. A UV/VIS spectrophotometer was used to measure reflectance of the mixture from 500 to 700 nm. As shown in FIG. 6, increased reflectance in the 600-700 nm range was provided by the sample with the hybrid pigment. Thus, the hybrid pigments can be used to tune the reflectance of a pigment composition.

The embodiments illustrated in the instant disclosure are for illustrative purposes only. They should not be construed to limit the claims. As is clear to one of ordinary skill in the art, the instant disclosure encompasses a wide variety of embodiments not specifically illustrated herein. While the compositions and methods of this disclosure have been described in terms of exemplary embodiments, it will be apparent to those of skill in the art that variations may be applied to the compositions and methods and in the steps or in the sequence of steps of the method described herein without departing from the concept, spirit and scope of the invention.

What is claimed is:

1. A hybrid pigment composition comprising a pigment or a dye reacted with a fibrous clay, wherein the pigment composition has higher reflectance in a near infrared region than a visible light region of the electromagnetic spectrum, and
    wherein the pigment or dye is selected from the group consisting of Solvent Yellow 33, Vat Red 1, Vat Red 41, and Vat Orange 5; and
    at least one additional dye or pigment.

2. The hybrid pigment composition of claim 1, wherein the fibrous clay is selected from palygorskite, sepiolite, and mixtures thereof.

3. The hybrid pigment composition of claim 1, wherein the hybrid pigment composition is tunable to provide high reflectance at a wavelength in the near infrared region.

4. The hybrid pigment composition of claim 1, wherein the at least one additional dye or pigment comprises at least one of the following: carbon black, indigo, an indigoid, and a thioindigoid.

5. The hybrid pigment composition of claim 1, wherein at least one additional dye or pigment is Solvent Blue 35.

6. An article comprising the hybrid pigment composition of claim 1 as a colorant.

7. The article of claim 6, wherein the article is a roofing material.

8. The article of claim 6, wherein the article is a molded polymer component.

9. The article of claim 6, wherein the article has a metameric index of less than about 1.

10. The article of claim 9, wherein the article is clothing or textiles.

11. The article of claim 9, wherein the article is a motor vehicle component.

12. A polymer composition comprising the hybrid pigment composition of claim 1 as a colorant.

13. A coating composition comprising the hybrid pigment composition of claim 1 as a colorant.

14. The coating composition of claim 13, wherein the coating composition is a paint.

15. An article coated with the coating composition of claim 13.

16. The article of claim 15, wherein the article is a motor vehicle, aircraft, or boat.

17. The article of claim 15, wherein the article is military hardware.

18. A method of cloaking an article comprising:
providing an article to be cloaked; and
coating the article with a hybrid pigment composition comprising a pigment or a dye and reacted with a fibrous clay, wherein the pigment composition has higher reflectance in a near infrared region than in the visible light region of the electromagnetic spectrum, and
wherein the pigment or dye is selected from the group consisting of Solvent Yellow 33, Vat Red 1, Vat Red 41, and Vat Orange 5; and
at least one additional dye or pigment.

19. The method of cloaking an article according to claim 18, wherein the coating composition is painted on the article.

* * * * *